(12) United States Patent
Hamelin

(10) Patent No.: US 11,135,532 B2
(45) Date of Patent: Oct. 5, 2021

(54) ROTOR ELEMENT AND A ROTOR FOR A SCREENING APPARATUS

(71) Applicant: AIKAWA FIBER TECHNOLOGIES INC., Sherbrooke (CA)

(72) Inventor: Mathieu Hamelin, Montreal (CA)

(73) Assignee: AIKAWA FIBER TECHNOLOGIES INC., Sherbrooke (CA)

( * ) Notice: Subject to any disclaimer, the term of this patent is extended or adjusted under 35 U.S.C. 154(b) by 0 days.

(21) Appl. No.: 16/788,403

(22) Filed: Feb. 12, 2020

(65) Prior Publication Data

US 2020/0179839 A1 Jun. 11, 2020

Related U.S. Application Data

(63) Continuation of application No. 14/391,329, filed as application No. PCT/FI2013/050573 on May 24, 2013, now Pat. No. 10,617,979.

(30) Foreign Application Priority Data

May 25, 2012 (FI) ..................................... 20125551

(51) Int. Cl.
*D21D 5/06* (2006.01)
*D21D 5/02* (2006.01)
(Continued)

(52) U.S. Cl.
CPC ........... *B01D 29/666* (2013.01); *D21D 5/026* (2013.01); *D21D 5/06* (2013.01); *B01D 2029/075* (2013.01)

(58) Field of Classification Search
None
See application file for complete search history.

(56) References Cited

U.S. PATENT DOCUMENTS 3,437,204 A 4/1969 Clarke-Pounder
4,894,147 A 1/1990 Rajala
(Continued)

FOREIGN PATENT DOCUMENTS

CA 2118410 C 8/1997
DE 102011086205 A1 5/2012
(Continued)

OTHER PUBLICATIONS

Office action from corresponding Finnish Application No. 20146011 dated May 17, 2018.
(Continued)

*Primary Examiner* — Krishnan S Menon
*Assistant Examiner* — Brad Gordon
(74) *Attorney, Agent, or Firm* — Heslin Rothenberg Farley & Mes; Nicholas Mesiti

(57) ABSTRACT

The present invention relates to a turbulence element for use with a rotor and a rotor featuring turbulence elements. The rotor is used in a screening apparatus of the pulp and paper industry. The turbulence element has a longitudinal centerline (CL); two longitudinal edges, a leading edge and a trailing edge; two opposite ends, a first end and a second end; and two surfaces, a top surface and a bottom surface arranged between the leading edge and the trailing edge. The top surface is divided into a leading surface having its origin at the leading edge, and a trailing surface having its origin at the trailing edge. The leading edge and the leading surface are provided with undulations (U).

25 Claims, 4 Drawing Sheets

(51) Int. Cl.
   *B01D 29/075*   (2006.01)
   *B01D 29/66*    (2006.01)

(56) References Cited

U.S. PATENT DOCUMENTS

| | | | | |
|---|---|---|---|---|
| 5,000,842 | A | 3/1991 | Ljokkoi | |
| 5,176,261 | A * | 1/1993 | Holz | D21D 5/026 |
| | | | | 209/270 |
| 5,192,438 | A * | 3/1993 | Frejborg | D21D 5/026 |
| | | | | 209/273 |
| 5,224,603 | A | 7/1993 | Hanana et al. | |
| 5,547,083 | A | 8/1996 | Alajaaski et al. | |
| 6,431,498 | B1 * | 8/2002 | Watts | B64C 3/10 |
| | | | | 244/198 |
| 2001/0045379 | A1 * | 11/2001 | Gabl | D21D 5/026 |
| | | | | 209/273 |
| 2010/0258483 | A1 * | 10/2010 | Pflueger | D21D 5/026 |
| | | | | 209/363 |

FOREIGN PATENT DOCUMENTS

| | | |
|---|---|---|
| EP | 0764736 B1 | 6/2002 |
| WO | WO8607105 A1 | 12/1986 |
| WO | WO2010043756 A1 | 4/2010 |

OTHER PUBLICATIONS

Search Report from corresponding Finnish Application No. 20146011 dated May 17, 2018.

International Search Report and Written Opinion for corresponding PCT Application No. PCT/FI2013/050573, dated Jul. 30, 2013.

International Preliminary Report on Patentability (IPRP) for corresponding PCT Application No. PCT/FI2013050573, dated Aug. 22, 2014.

Office action from corresponding Austrian Application No. A9198/2013 dated Jan. 27, 2015.

* cited by examiner

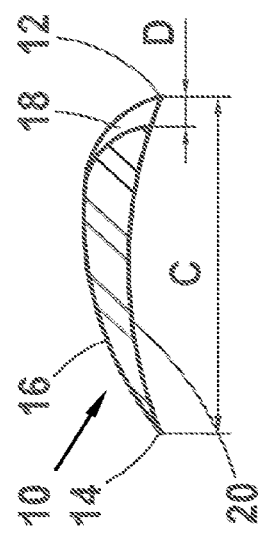
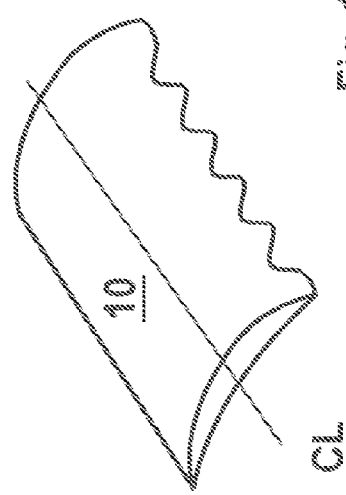
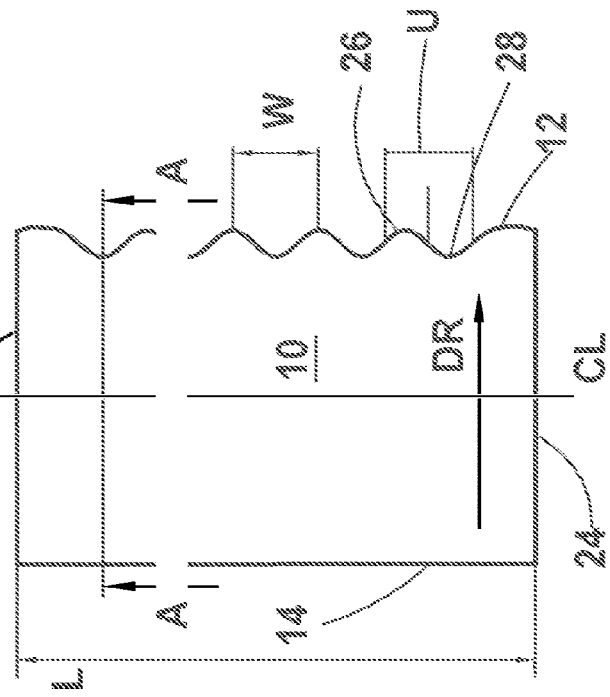

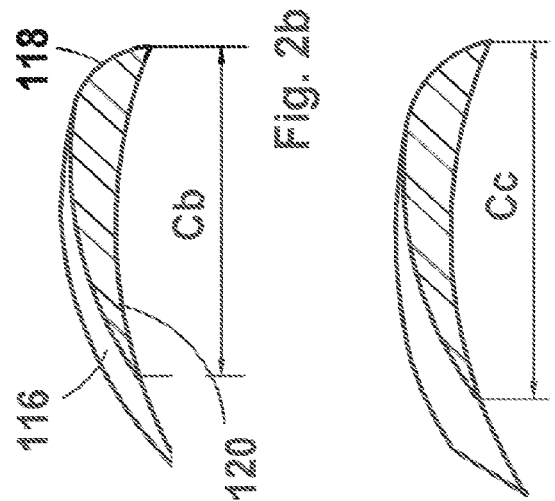
Fig. 2b
Fig. 2c
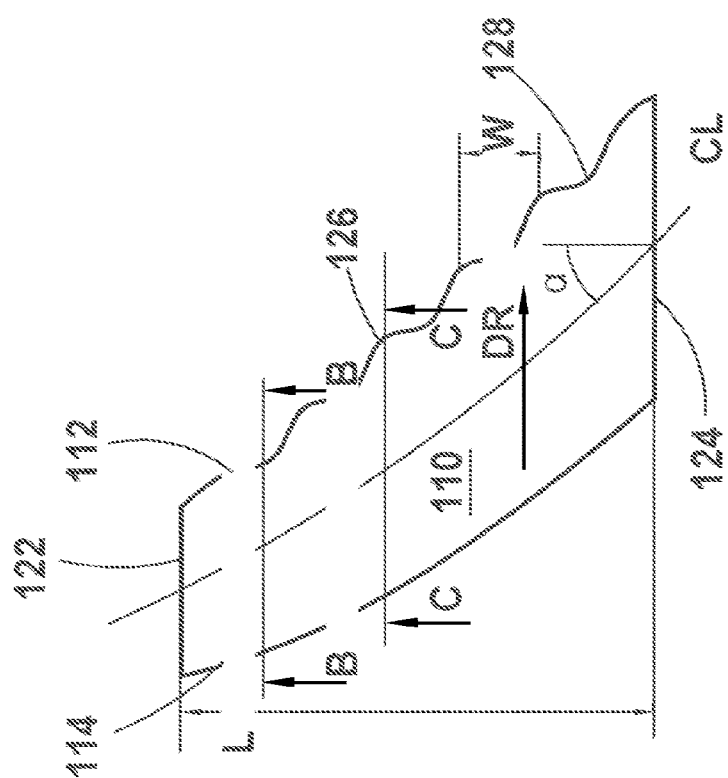
Fig. 2a

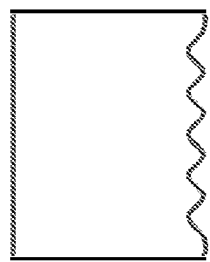
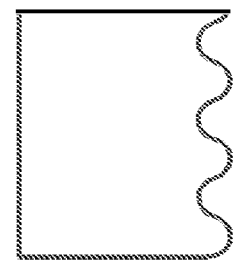
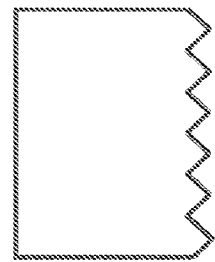
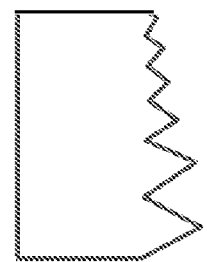
Fig. 5

ROTOR ELEMENT AND A ROTOR FOR A SCREENING APPARATUS

CROSS-REFERENCE TO RELATED APPLICATION

This application is a continuation of U.S. application Ser. No. 14/391,329, filed Oct. 8, 2014, titled "Rotor Element and a Rotor for a Screening Apparatus", which is a U.S. National Phase Application of International PCT No. PCT/FI2013/050573 filed on May 24, 2013, which claims priority to Finnish Patent Application No. 20125551 filed May 25, 2012. The contents of each of these applications are hereby incorporated by reference herein in their entirety.

BACKGROUND OF THE INVENTION

Technical Field

The present invention relates to a turbulence element and a rotor for a screening apparatus. The turbulence element and the rotor of the present invention are particularly suitable for use in connection with screening apparatuses of the pulp and paper industry.

Background Art

The screening apparatus used nowadays in the pulp and paper industry is almost without exception a pressurized screening device i.e. a so-called pressure screen into which the pulp to be screened is introduced in a pressurized state. The most popular pressure screens comprise a stationary screen cylinder and a rotating rotor in cooperation therewith. The purpose of the screen cylinder is to divide the fresh pulp or the fiber suspension entering into the screening zone where the rotor rotates into an acceptable fiber fraction called the accepts, and a rejectable fiber fraction called the rejects. The screen cylinder as well as, naturally, the rotor are located inside a screen housing having ducts for both the fresh fiber suspension, the accepts, and the rejects. Normally, the inlet duct or inlet for the fiber suspension is at one end of the screen housing, whereby the rejects outlet is at the opposite end of the housing. The accepts outlet is in communication with the accepts zone which is positioned at the opposite side of the screen cylinder in relation to the screening zone. The purpose of the rotor is to create turbulence, and positive and negative pressure pulses in the fiber suspension to be screened to ensure that the apertures in the screen cylinder do not become plugged with pulp and debris. This purpose is achieved by providing the rotor with specific turbulence or rotor elements. Additional features and advantages are realized through the techniques of the present invention. Other embodiments and aspects of the invention are described in detail herein and are considered a part of the claimed invention.

At this stage it should be understood that screening devices whose screen cylinder is rotary, and the means creating turbulence and pressure pulses is stationary, are also known, though more seldom used. The word 'rotor' is intended to cover also this kind of turbulence creating means, as they can be said to rotate in relation to the screen cylinder. Also it should be understood that the term screen cylinder covers all screening means having openings, i.e. holes or slots, for instance, and having a rotationally symmetric shape. Thus conical or frusto-conical shapes are also covered, and known from prior art.

The pressure screens are most often positioned such that their shaft is in an upright position. However, the pressurization of the fibre suspension makes it possible to position the shaft of a pressure screen in any direction including a horizontal direction. Due to the pressurized feed of the fibre suspension, it may be introduced into a pressure screen to the top, to the bottom or to the centre region thereof.

The pressure screens may also be divided into two groups based on the direction of the accepts flow through the screen cylinder. When the accepts flow radially outwardly, the screen is called an outflow screen, and when the accepts flow radially inwardly, the screen is called an inflow screen.

In accordance with the prior art there are, in principle, two different types of rotors, which are commonly used in the pulp and paper industry and the intention of which, as known, is to maintain the screen surface clean, in other words to prevent blockage of the apertures in the screen cylinder, and maintain sufficient turbulence in the screening zone containing the fresh, i.e. non-screened fiber suspension. These two types of rotors may be called an open rotor and a closed rotor. An example of an open rotor is disclosed in EP-B1-0764736 in which the rotor is arranged inside a stationary screen cylinder. This type of rotor comprises a concentric shaft and a number of turbulence elements in the form of foils extending close to the surface of the screen cylinder. Each foil is supported on the shaft by means of one or more arms extending through the screening zone which contains fresh pulp when the screening apparatus is in operation. The foils may be axial or they may form an angle with the shaft of the rotor and the axis of the screen cylinder. While the foil, or the fibre suspension in relation to the foil, is moving, the trailing surface of the foil subjects the screen surface to a negative pressure pulse for flushing the apertures of the screen cylinder or, rather, for preventing the fibres from accumulating on the screen surface and from blocking the screening openings by means of creating a back flow from the accepts zone to the screening zone.

An example of the other rotor type, i.e. the closed rotor, has been discussed, for instance, in U.S. Pat. No. 3,437,204, in which the rotor is a substantially-cylindrical closed body positioned inside a screen cylinder. The rotor surface in this patent is provided with turbulence elements, i.e. protrusions, which are almost hemispherical in form. In this kind of apparatus, the fresh fibre suspension is fed between the rotor and the screen cylinder, whereby the protrusions of the rotor, the so-called bumps, create turbulence and pressure pulses towards and away from the screen cylinder. In other words, the leading surface of each bump pushes the pulp towards the screen cylinder and the trailing surface of the bump induces a suction pulse that draws the fiber accumulations from the apertures of the screen cylinder. Most often the closed rotor surface is cylindrical. In a broader sense, rotationally-symmetrical rotor surfaces may also be discussed, as there are rotors having a frusto-conical shape or a dome shape. Additionally, there are also rotors not literally having a rotationally symmetrical shape. One such rotor is a so-called S-Rotor, which is formed of two identical cylinder halves attached to each other such that two radially, or substantially radially, arranged surfaces join the half-cylindrical surfaces.

The above mentioned EP-B1-0764746 also teaches that a turbulence element closely resembling a foil may be attached on the surface of a closed rotor. In other words, the turbulence element has a rounded or curved surface, i.e. a convex leading surface between the leading edge of the turbulence element and the peak-line, a line defining the position where the element is at its highest, and a curved trailing surface between the peak-line and the trailing edge of the element. Like the foil of an open rotor, the turbulence element of a closed rotor may extend either continuously from the first end of the rotor to the second end thereof or for a substantial part of the length of the rotor. In a similar manner, the turbulence element may extend axially along the rotor surface or it may form a sharp angle with the axial direction.

Pulp screens are commonly used to remove oversize contaminants, such as plastic specks, fiber bundles or glass fragments from pulp. These contaminants might otherwise reduce the appearance of the paper, tissue, paper board or other products which are made from the pulp. The contaminants might also weaken the paper product or lead to operating problems. In addition, if the contaminants fall out of the partially-formed paper or other paper product, they can foul the equipment used to make the paper products. For any of these various reasons, pulp is screened to remove oversize contaminants from the desirable pulp fibers at an early stage of the pulping and papermaking processes.

While the intent of the pulp screen is to remove contaminants, it must also have a sufficiently high capacity to support the production of the mill and to not limit production. Reduced power consumption is also an objective of improved pulp screening operation.

The two critical components within a pulp screen are the screen cylinder and the screen rotor. The cylinder has small holes or narrow slots through which the fibers pass, but the oversize contaminants do not. The rotor most typically rotates, though there are some pulp screen designs where the rotor is stationary and the screen cylinder rotates. In the typical configuration, where the rotor rotates, the primary objective of the rotor is to ensure that the cylinder does not become permanently plugged with fibers, contaminants and other material and thus unable to process the required flow of pulp. The rotor accomplishes this in two ways. First, the rotor will generate suction pulses which backflush blockages in apertures in the screen cylinder and thus clears the cylinder apertures.

Second, the rotor can also generate three-dimensional turbulence and fluid activity which removes incipient blockages at the aperture entry and applies forces in a multiplicity of directions to help to release any blocked material. Rotors will typically rely mostly or often entirely on the first method, which focuses on blockage removal by simple, mostly radial backflushing pulse. The limited effectiveness of such a single-direction action requires that the rotors rotate at relatively high speeds to provide a strong and frequent backflushing action. Power consumption will tend to be quite high with this approach.

A few rotors have been designed to also provide some three-dimensional activity with the intention of augmenting the main backflushing action, as discussed previously. These other rotors have failed, however, to effectively combine the "activity" and "backflushing" actions. For example, the bump-type (for instance U.S. Pat. No. 3,437,204) and similar (for instance CA-C-1,335,088) type rotor elements generate relatively large-scale three-dimensional activity, but the activity occurs adjacent the pulse generating element and is not effectively coupled with the backflushing action. Likewise another rotor design discussed in CA-C-2, 118,410 has foil-type elements, with some ridges attached to the surface of the foil, which provides some small three-dimensional scale activity, but the activity occurs at virtually the same time as the rotor suction pulse and the benefit is lost.

U.S. Pat. No. 5,176,261 discusses a rotor for pressure sorters for sorting fibrous suspensions. The rotor comprises a plurality of cleaning vanes provided for the circulation on the inlet side of a screen cylinder of the pressure sorter, these vanes being designed in sections as return regions and in sections as supply regions; the return regions are designed such that they urge the fibrous suspension portions adjacent the screen inlet side away from the screen cylinder, whereupon these fibrous suspension portions are diverted by the supply regions of the cleaning vanes towards the screen inlet side and fed back to the latter.

U.S. Pat. No. 5,224,603 discusses an apparatus and method for treating fiber suspension. The apparatus is especially applicable for pulp screening in the wood processing industry, particularly for the separation of light particles from fiber suspensions. The apparatus comprises an outer casing with conduits for inlet pulp, accepts, heavier rejects and lighter rejects; a filter cylinder and a rotor, the surface of which is provided with at least one protrusion; and an opening for guiding the light rejects through the surface of the rotor.

DE-A1-10 2011 086 205 discusses a wing for fiber mass sorter. The wing has adjustable fins that are arranged at the end portions of the wing, to prevent ejection of the fiber mass over the ends of the wing. A spring is arranged at guidance portion and a slider suspension is arranged at discharge section. The upper and bottom surfaces are connected with the guidance edge and exit edge of the wing.

Thus the main problems with the prior art rotors are that [0021] they are incapable of creating any three-dimensional activity in connection with the rotor operation (such as with long, foil-type elements on the rotor surface), or [0022] the three-dimensional activity is simultaneous with the radial backflushing, or [0023] the three-dimensional activity created in connection with the rotor elements results in guiding the pulp to be screened to the axial sides of the element and thus weakening the effect of the activity.

A further problem resulting from the inefficient operation of the prior art rotors is their requirement for higher rotor speed, which means in practice higher power consumption.

BRIEF SUMMARY OF THE INVENTION

An object of the present invention is to develop a rotor element or turbulence element and a rotor, which avoids at least some of the problems discussed in connection with the above prior art rotors.

A further object of the present invention is to generate three-dimensional fluid activity and forces that may begin to weaken and release a blockage and then to follow this almost immediately, but not coincidentally, with the stronger backflushing pulse.

A still further object of the present invention is to design a turbulence element and a rotor that may be rotated more slowly and that is more energy-efficient than prior art rotors.

At least one of the above objects has been achieved in the present invention by providing the leading edge of the turbulence elements with undulations. The undulated features of the leading edge and the leading surface of the turbulence element are of a sufficiently large scale that they induce some preliminary, three-dimensional activity to weaken a blockage. This preliminary activity is then followed by the main pulsing and backflushing action of the turbulence element while the blockage remains disturbed.

This more effective rotor action may be used to increase screen capacity and reliability. In addition, the more effective rotor action will allow the rotors to be operated at slow rotational speeds to achieve power savings.

The above-mentioned objects are achieved by means of a novel turbulence element and rotor construction, the characterizing features of which will become clear in the appended claims.

BRIEF DESCRIPTION OF THE DRAWINGS

The turbulence element and the rotor of the present invention are discussed in more detail in the following description with reference to the accompanying drawings of which:

FIG. 1a illustrates a cross-sectional view of a turbulence element in accordance with a first preferred embodiment of the present invention taken along line A-A of FIG. 1b, FIG. 1b illustrates a top view of a turbulence element in accordance with a first preferred embodiment of the present invention, FIG. 1c illustrates a perspective view of the turbulence element in accordance with a first preferred embodiment of the present invention, FIG. 2a illustrates a top view of a turbulence element in accordance with a second preferred embodiment of the present invention, FIGS. 2b and 2c illustrate two cross-sectional views of a turbulence element in accordance with a second preferred embodiment of the present invention taken along lines B-B and C-C of FIG. 2a, respectively, FIG. 5 illustrates a few examples for the design of the leading edge of the turbulence element of the present invention.

DETAILED DESCRIPTION OF DRAWINGS

Figure 3A:
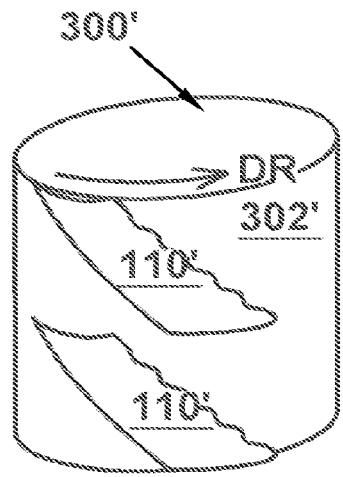
FIGS. 3a and 3b illustrate schematically solid rotors provided with two visible turbulence elements of FIGS. 2a-2c.

FIGS. 1a, 1b and 1c illustrate a turbulence element 10 of a first preferred embodiment of the present invention. The turbulence element 10 is planned to be attached on the surface of a solid, most often, cylindrical rotor surface such that the direction of movement of the turbulence element in relation to the pulp or fiber suspension to be screened is shown by arrow DR. In case the rotor is a rotary one, the arrow shows the direction of the rotation of the rotor. The element may be fastened either directly on a rotationally symmetrical rotor surface, by means of one or more short arms on a rotationally symmetrical rotor surface, or by means of one or more arms on the shaft of the rotor. The element 10 has a longitudinal centreline CL, a leading edge 12 and a trailing edge 14. When defining the centreline CL of the turbulence element, the CL is considered to lie midway between the trailing edge and either a virtual line along the outermost edges of the wave extensions at the leading edge or the leading edge. Normally the main directions of the leading and trailing edges are parallel with the centreline CL, but there may be cases when the main directions of the edges form an angle with the centreline CL. Also, the trailing edge is usually linear, but it is also within the scope of the present invention that the trailing edge is curved, whereby also the centreline CL may be curved. However, it is also possible that the trailing edge is curved and the centreline CL linear, whereby also the leading edge should be curved, but in a direction opposite to that of the trailing edge. The element 10 has a top surface formed of a leading surface 18 extending from the leading edge 12 towards the trailing edge 14, and a trailing surface 16 extending from the trailing edge 14 towards the leading edge 12. The leading and trailing surfaces meet along the peak-line of the turbulence element, i.e. at the highest point of the turbulence element and form a straight, curved or wavy peak-line along the top surface of the turbulence element, where the distance from the rotor to the screen cylinder is at its smallest. The turbulence element 10 has also a bottom surface 20, which faces, and lies against the solid rotor surface when the element is fastened on the solid core rotor. The leading surface 18 is a convex or concave surface or a planar surface forming an acute angle with the bottom surface 20. The acute angle is measured in a plane perpendicular to the axis of the rotor between a line running via the leading edge and the above defined peak-line running highest on the turbulence element. Thereby the angle could as well be called an average angle. The acute angle means, too, that, the radial clearance between the turbulence element and the screen cylinder decreases from the leading edge to the above mentioned peak-line, and so does the radial clearance between the trailing surface of the turbulence element and the screen cylinder when moving from the trailing edge to the peak-line. In other words, both the leading and trailing surfaces are sloping, i.e. the surfaces are inclined in relation to a cylindrical surface running via the leading edge and/or the trailing edge of the turbulence element. And finally the turbulence element 10 has two side surfaces 22 and 24 at its opposite axial ends. In the case of an open rotor, one or more arms carrying the turbulence element are fastened to the bottom or the side surfaces of the turbulence element. In the turbulence element of this first preferred embodiment of the present invention, the centreline CL is axially aligned when the turbulence element 10 is fastened on the rotor surface, i.e. it is parallel with the rotor axis. In this case too, the end or side surfaces 22 and 24 are preferably, but not necessarily, situated in planes perpendicular to the rotor surface or to the axis of the rotor, whereby the end surfaces extend in a circumferential direction.

The main direction of the leading edge 12 of the turbulence element 10 of a first variation of the first preferred embodiment is generally parallel with the trailing edge 14. However, in accordance with a second variation of the present invention, the leading edge 12 of the turbulence element 10 of the present invention is not linear but wavy or undulated, i.e. the leading edge 12 is provided with waves or undulations U such that, in the longitudinal direction (i.e. the general direction of the centreline CL) the leading edge 12, has a plurality of consecutive extensions 26 and recessions 28 as shown in FIG. 1b. In either case (i.e. in either variation) the leading surface 18 of the turbulence element is, in its longitudinal direction (i.e. the general direction of the centreline CL), provided with undulations as shown in FIG. 1a, which is a cross section taken along line A-A of FIG. 1b. In other words, the extensions 26 of the second variation extend as hills, and the recessions 28 of the second variation extend as valleys up along the leading surface 18 towards the peak-line and starting from the leading edge 12. In accordance with the first variation, the hills of the leading surface start directly from the leading edge of the element. To form the valleys in the leading surface, the leading surface is immediately after the leading edge bent inwards to form a concave surface. In accordance with this embodiment, the thus-formed undulations, i.e. the hills and valleys, extend along the leading surface 18 at most for the entire circumferential length of the leading surface 18, i.e. from the leading edge to the peak-line, but, not necessarily for the entire length thereof. The dimensioning of the turbulence element 10 is preferably such that the turbulence element 10 has a longitudinal dimension, i.e. length L, and a chord length, C, the chord length C being the longest linear dimension in a radial plane, i.e. a plane being at right angle to the axis of the rotor, between the trailing edge 14 and the leading edge 12, i.e. distance from the trailing edge 14 to the top of the extension 26 in the leading edge 12. The undulations have a depth D (see FIG. 1a) and width W (see FIG. 1b). The depth D varies along the length of the undulation, i.e. from the leading edge to the centreline of the turbulence element. Thus the greatest depth of the undulation may be found at the leading edge as shown in FIG. 1a, but the greatest depth may as well be found somewhere upper at the leading surface. Especially, if the leading edge of the turbulence element is straight. The greatest depth D is preferably between 5-25%, more preferably between 10 and 15%, of the chord length C. The width of an undulation may be equal for the entire length of the undulation, but the width may also be variable. The width W is, or varies, preferably between 10 and 50%, more preferably between 15 and 35% of the chord length C. In order to create in front of the screen surface, i.e. in front of the screening apertures, three-dimensional activity of a sufficient magnitude, the leading edge of the turbulence element 10 should include at least two, preferably more than two, extensions and recessions. In such a case that the undulations at the leading edge or the leading surface of the turbulence element have a constant shape, the above definition means that the length L of the turbulence element 10 is preferably at least 2*W, more preferably at least 4*W. The turbulence element of the invention has a length L, preferably, but not necessarily, equal to at least twice the chord length C.

The turbulence element 10 of FIGS. 1a and 1b functions such that when the flow of a fiber suspension meets the leading surface 18 of the turbulence element, the parts of the fiber suspension hitting the extensions or hills of the leading surface not only move over the extension in the direction of the rotation, but are also deflected sideways perpendicular to the direction of rotation generating three-dimensional activity, which is apt to loosen the blockages from the apertures in the screen cylinder.

FIGS. 2a, 2b and 2c illustrate a turbulence element 110 of a second preferred embodiment of the present invention. The turbulence element 110 is intended to be attached on the surface of a solid, most often, a cylindrical surface of a rotor such that the direction of movement of the turbulence element in relation to the pulp or fiber suspension to be screened is shown by arrow DR. In case the rotor rotates, the arrow shows the direction of the rotation of the rotor. The element 110 may be fastened either directly on a rotationally symmetrical rotor surface, by means of one or more short arms on a rotationally symmetrical rotor surface, or by means of longer arms on the shaft of the rotor. The element 110 has a longitudinal centreline CL, a leading edge 112 and a trailing edge 114. Normally the main directions of the leading and trailing edges are parallel with the centreline, but there may be cases when the main directions of the edges form an angle with the centreline CL. The element 110 has a top surface formed of a leading surface 118 extending from the leading edge 112 towards the trailing edge 114, and a trailing surface 116 extending from the trailing edge 114 towards the leading edge 112. The leading and trailing surfaces meet at the peak-line of the turbulence element which may be a straight, curved or wavy line along the top surface of the turbulence element, and is the location where the distance from the rotor to the screen cylinder is at its smallest. The turbulence element 110 has also a bottom surface 120, which faces and lies against the solid rotor surface when the element is fastened on the solid-core rotor. The leading surface 118 is a convex, concave or planar surface forming an acute angle with the bottom surface 120. The acute angle is measured in a plane perpendicular to the axis of the rotor between a line running via the leading edge and the above defined peak-line running highest on the turbulence element. Thereby the angle could as well be called an average angle. The acute angle also means that the radial clearance between the turbulence element and the screen cylinder decreases from the leading edge to the above mentioned peak-line, and so does the radial clearance between the trailing surface of the turbulence element and the screen cylinder when moving from the trailing edge to the peak-line. In other words, both the leading and trailing surfaces are sloping, i.e. inclined in relation to a cylindrical surface running via the leading edge and/or the trailing edge of the turbulence element. And finally the turbulence element 110 has two end or side surfaces 122 and 124 at its opposite axial ends. In this case, the end surfaces 122 and 124 are preferably, but not necessarily, situated in planes perpendicular to the rotor surface, whereby the end surfaces extend in a circumferential direction. However, the end surfaces may also be located in a plane perpendicular to the trailing edge or, in fact, in any other imaginable plane. In the case of an open rotor, one or more arms carrying the turbulence element are fastened to the bottom or the side surfaces of the turbulence element. In the turbulence element of this second preferred embodiment, the centreline CL is aligned at an angle .alpha. in relation to a plane running along the axis of the rotor when the turbulence element 110 is fastened on the rotor surface. The angle .alpha. is preferably between −45 and 45 degrees. This means in practice that if the turbulence element 10 is kept as the starting point, the element is not only stretched to a trapezoidal shape but is also twisted to a spiral shape such that the bottom surface 120 of the rotor substantially conforms to the solid rotor surface onto which it is to be fastened. For the above reason, the lengths of end surfaces 122 and 124 in the top view of FIG. 2a are not equal. To be specific, the top view of FIG. 2a is taken directly above the end surface 124.

The main or general or average direction of the leading edge 112 of the turbulence element 110 of a first variation of the second preferred embodiment is generally parallel with the trailing edge 114. In accordance with a second variation, the leading edge 112 of the turbulence element 110 of the second preferred embodiment of the present invention is not linear but wavy or undulated, i.e. in a similar manner than in the second variation of the first embodiment of the present invention shown in FIG. 1b. The turbulence element of the second variation is thus provided with undulations such that the leading edge 112 has, in its longitudinal direction, a plurality of consecutive extensions 126 and recessions 128 as shown in FIG. 2a. The undulations are naturally found in the leading surface 118, too, as shown in FIGS. 2b and 2c. Thus the design variations already discussed in connection with the two variations of the first embodiment of the present invention are applicable to the second embodiment as well. In other words, FIG. 2b illustrates a cross section taken along line B-B of FIG. 2a, whereby the chord length Cb represents the smallest linear chord length measured in the radial plane between the trailing edge 114 and the bottom or valley 128 of the undulations. In a corresponding manner, FIG. 2c illustrates a cross section taken along line C-C of FIG. 2a, whereby the chord length Cc represents the longest linear chord length measured in a radial plane, i.e. a plane being at a right angle to the axis of the rotor, between the trailing edge 114 and the top or extension 126 of the undulations. The extensions 126 extend as hills, and the recessions 128 extend as valleys up along the leading surface 118. In accordance with this embodiment of the present invention the thus formed undulations, i.e. hills and valleys extend along the leading surface 118 for at most the entire circumferential extension of the leading surface 118, i.e. from the leading edge to the peak-line, but not necessarily to the entire length thereof. The dimensioning of the turbulence element 110 is preferably such that the turbulence element 110 has a length L and a chord length C. The chord length C is the longest linear distance in a radial plane between the trailing edge 114 and the leading edge 112, i.e. a distance from the trailing edge 114 to the extension 126 in the leading edge 112 shown as dimension Cb in FIG. 2b and dimension Cc in FIG. 2c. The undulations or valleys have a depth D corresponding to Cc minus Cb (see FIGS. 2b and 2c) and width W, i.e. a dimension between the tops of two consecutive extensions (or recessions) (see FIG. 2a). The depth D is preferably between 5-25%, more preferably between 10 and 15%, of the chord length C (here same as Cc), and the width preferably between 10 and 50%, more preferably between 15 and 35%, of the chord length C (here same as Cc). In order to create in front of the screen surface, i.e. in front of the screening apertures, three-dimensional activity of a sufficient magnitude to support the clearing of the apertures, the leading edge of the turbulence element 10 should include at least two, and preferably more than two, extensions and recessions. In such a case that the undulations at the leading edge or the leading surface of the turbulence element have a constant shape, the above definition means that the length L of the turbulence element 10 is preferably at least 2*W, more preferably at least 4*W. The turbulence element of the invention has a length L preferably, but not necessarily, equal to at least twice the chord length C.

Figure 3B:
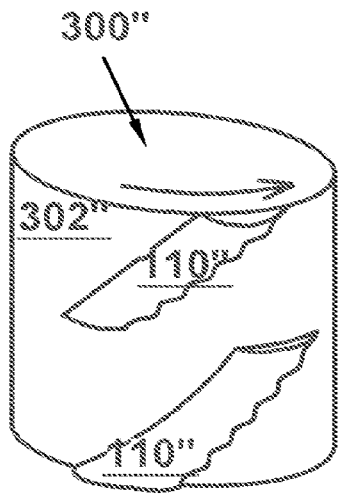

FIGS. 3a and 3b show two exemplary embodiments where the turbulence elements 110' and 110" of the second preferred embodiment of the present invention are positioned on the surface 302' and 302" of a substantially (including all rotationally symmetric rotor types) cylindrical solid rotor 300' and 300". The elements 110' and 110" may be positioned either more or less randomly, or, more preferably, in accordance with a certain well-designed pattern on the surface 302' and 302" of the rotor to provide regular and periodic pulsations at the aforementioned openings in the screen cylinder. As may be seen the direction of the centreline of the elements may change from −45 (FIG. 3a) to +45 degrees (FIG. 3b).

Figure 4:
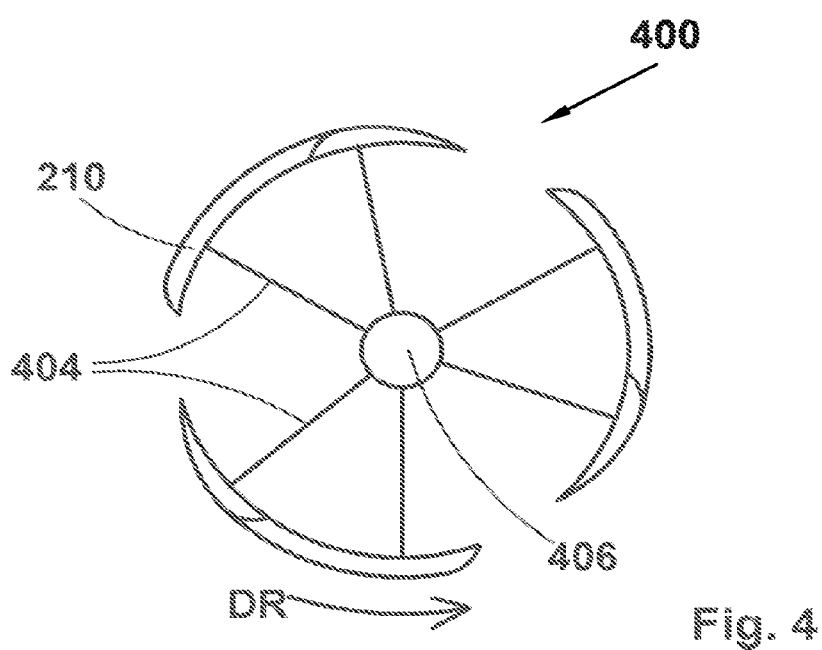
FIG. 4 illustrates schematically an open rotor provided with three foils closely resembling those discussed in more detail in connection with FIGS. 2a-2c.

FIG. 4 shows as another exemplary embodiment, the turbulence elements 210, which substantially correspond to the elements 110 of FIGS. 3a-3c, arranged by means of arms 404 on the shaft 406 of an open rotor 400, also including structures where the rotor is formed of a cylindrical or otherwise rotationally symmetrical body on which the turbulence elements are arranged by means of the above mentioned arms. As above in FIG. 3, the elements may be arranged more or less randomly on the rotor shaft, and more preferably in a certain well-designed pattern to provide regular and periodic pulsations at the aforementioned openings in the screen cylinder.

FIG. 5 shows, as an example, four different configurations for the undulations. In view of the examples, it is clear that the undulations used in the leading edge or their cross-section at the leading surface of the turbulence element of the present invention may be formed of saw-tooth shaped or rounded extensions and recessions. The saw-tooth shape may have a tip angle of from about 45 degrees to about 150 degrees. The rounded extensions and recessions of the undulations may be formed from half circles to one eighths of a circle. Also, it is possible that the undulations are formed of any imaginable combinations of curves and lines including, for instance, sharp inflection points and/or curved transitions. Further, the shape and size of the undulations may be either constant or changing along the length of the turbulence element. In other words, both the width and the height of the undulations may change. Naturally, it is also possible that only one of either the width and the length of the undulations change.

The turbulence element of the present invention may also be provided with additional means arranged on, or in connection with, the surfaces of the element.

A first additional means are winglets, i.e. strips or lists attached on all or any one of the trailing surface, the leading surface and the bottom surface of the turbulence element. Such winglets extend preferably in a desired direction from the surface of the turbulence element. In other words, they may be positioned in a radial plane, whereby they are positioned perpendicular to the turbulence element surface. However, it is also possible to arrange the winglets in a plane deviating somewhat from a radial plane, whereby the winglets guide the flow in a desired direction, i.e. either in a circumferential direction or in a direction towards or away from the reject end of the screen cylinder. Naturally, the winglets may be also curved if desired.

While the invention has been discussed and described above in view of a few preferred embodiments, it has to be understood that the above description should by no means be considered as limiting the scope of the invention from what has been disclosed in the appended claims. Also it has to be understood that various specific details discussed in connection with a certain embodiment may be used in connection with other embodiments of the invention whenever practically possible.

What is claimed is:

1. A screening apparatus for screening a pulp fiber suspension, the screening apparatus comprising:
   a screen cylinder; and
   a rotor rotatable relative to the screen cylinder, the rotor comprising rotor elements thereon facing the screen cylinder, at least one of the rotor elements comprising:
   a centerline (CL);
   a length (L) in a direction of an axis of the rotor;
   a leading edge and a trailing edge;
   two opposite ends, a first end and a second end; and
   a top surface facing the screen cylinder between the leading edge and the trailing edge, the top surface divided into a leading surface extending from the leading edge and a trailing surface extending from the trailing edge, the leading and trailing surfaces meeting at a peak, wherein the leading surface comprises undulations (U) configured to contact a fiber suspension and facilitate weakening and releasing a blockage in the screen cylinder.

2. The screening apparatus as recited in claim 1, wherein the at least one of the rotor elements comprise at least two extensions and at least two recesses recessions at the leading edge.

3. The screening apparatus as recited in claim 1, wherein the at least one of the rotor elements have a chord length (C, Cc), the chord length (C, Cc) defined as a longest linear dimension in a radial plane between the trailing edge and the leading edge, and wherein the undulations (U) have a greatest depth (D) equal to 5-25% of the chord length (C).

4. The screening apparatus as recited in claim 1, wherein the at least one of the rotor elements have a chord length (C, Cc), the chord length (C, Cc) defined as a longest linear dimension in a radial plane between the trailing edge and the leading edge, and the undulations (U) have a width (W) such that the width is between 10 and 50% of the chord length (C).

5. The screening apparatus as recited in claim 4, wherein the length (L) of the at least one of the rotor elements is equal to at least twice the chord length (C).

6. The screening apparatus as recited in claim 1, wherein the trailing edge of the at least one of the rotor elements extends parallel to the centerline (CL).

7. The screening apparatus as recited in claim 1, wherein the trailing edge of the at least one of the rotor elements forms an angle with the centerline (CL).

8. The screening apparatus as recited in claim 1, wherein the at least one of the rotor elements comprise a spiral shape.

9. The screening apparatus as recited in claim 1, wherein at least one of the leading surface and the trailing surface of the at least one of the rotor elements is provided with one or more winglets.

10. The screening apparatus as recited in claim 1, wherein the at least one of the rotor elements are attached on a rotationally symmetric surface of the rotor, wherein a bottom surface of the rotor elements face the rotor.

11. The screening apparatus as recited in claim 1, wherein the at least one of the rotor elements are located on a rotationally symmetric surface of the rotor, wherein the leading edge of the rotor elements are formed where the leading surface of the rotor elements meet the rotor.

12. The screening apparatus as recited in claim 1, wherein the at least one of the rotor elements are attached by one or more arms on a shaft of the rotor.

13. The screening apparatus as recited in claim 1, wherein the at least one of the rotor elements are arranged on a surface of the rotor such that the longitudinal centerline (CL) of the rotor elements form an acute angle with a plane extending along the axis of the rotor.

14. The screening apparatus as recited in claim 13, wherein the acute angle is between −45 degrees and +45 degrees.

15. The screening apparatus as recited in claim 14, wherein said acute angle varies from a first end of the at least one of the rotor elements to the second end of the at least one of the rotor elements.

16. A rotor element for a screen cylinder for screening a pulp fiber suspension comprising: a centerline CL; a length (L); two edges comprising a first edge and a second edge; two opposite ends comprising a first end and a second end; and a top surface between the first edge and the second edge; the top surface divided into a first surface having an origin at the first edge, and a second surface having an origin at the second edge, the first and second surfaces meeting at a peak, and the first surface having a circumferential length between the first edge and the peak-line, and the first surface having undulations (U) configured to contact the pulp fiber suspension and facilitate weakening and releasing of a blockage in the screen cylinder.

17. The rotor element as recited in claim 16, wherein the rotor element has a chord length (C, Cc), the chord length (C, Cc) defined as a longest linear dimension in a radial plane between the second edge and the first edge, and wherein the undulations (U) have a greatest depth (D) equal to 5-25% of the chord length (C).

18. The rotor element as recited in claim 16, wherein the rotor element has a chord length (C, Cc), the chord length (C, Cc) defined as the longest linear dimension in a radial plane between the second edge and the first edge, and wherein the undulations (U) have a width (W) such that the width is between 10 and 50% of the chord length (C).

19. The rotor element as recited in claim 18, wherein the length (L) of the rotor element is equal to at least twice the chord length (C).

20. The rotor element as recited in claim 16, wherein the second edge of the rotor element extends parallel to the centerline (CL) of the rotor element.

21. The rotor element as recited in claim 16, wherein the second edge of the rotor element forms an angle with the centerline (CL).

22. The rotor element as recited in claim 16, wherein the rotor element comprises a spiral shape.

23. The rotor element as recited in claim 16, wherein at least one of the first surface, the second surface of the turbulence element is provided with one or more winglets.

24. The rotor element as recited in claim 16, wherein the rotor element is located on a rotationally symmetric surface of a rotor, wherein the leading edge of the rotor element is formed where the first surface of the rotor element meets the rotor.

25. A rotor element for a screen cylinder for screening a pulp fiber suspension comprising: a centerline CL; a length (L); two edges comprising a first edge and a second edge; two opposite ends comprising a first end and a second end; and a top surface between the first edge, the second edge, the first end and the second end; the top surface divided into a leading portion having an origin at the first edge, and a trailing portion having an origin at the second edge, the leading portion and trailing portion meeting at a peak; and the leading portion of the top surface having undulations (U) configured to contact the pulp fiber suspension and facilitate prevention of blockages in the screen cylinder.

* * * * *